United States Patent
Sadler

(10) Patent No.: US 12,444,974 B1
(45) Date of Patent: Oct. 14, 2025

(54) SYSTEM AND METHOD FOR CREATION AND OPERATION OF A MICROGRID FROM A PREEXISTING ELECTRIC GRID

(71) Applicant: Pondera LLC, Blue, AZ (US)

(72) Inventor: Clinton A. Sadler, Blue, AZ (US)

(73) Assignee: Pondera LLC, Blue, AZ (US)

( * ) Notice: Subject to any disclaimer, the term of this patent is extended or adjusted under 35 U.S.C. 154(b) by 0 days.

(21) Appl. No.: 18/631,881

(22) Filed: Apr. 10, 2024

(51) Int. Cl.
| | |
|---|---|
| H02J 13/00 | (2006.01) |
| G01R 21/00 | (2006.01) |
| H02J 3/00 | (2006.01) |
| H02J 3/18 | (2006.01) |
| H02J 3/24 | (2006.01) |
| H02J 3/38 | (2006.01) |
| H02J 3/44 | (2006.01) |

(52) U.S. Cl.
CPC ...... *H02J 13/00006* (2020.01); *G01R 21/003* (2013.01); *H02J 3/0012* (2020.01); *H02J 3/1842* (2013.01); *H02J 3/241* (2020.01); *H02J 3/388* (2020.01); *H02J 3/44* (2013.01); *H02J 13/00002* (2020.01); *H02J 13/0004* (2020.01)

(58) Field of Classification Search
CPC .. H02J 13/00006; H02J 3/0012; H02J 3/1842; H02J 3/241; H02J 3/388; H02J 3/44; H02J 13/00002; H02J 13/0004; G01R 21/003
See application file for complete search history.

(56) References Cited

U.S. PATENT DOCUMENTS

| | | | |
|---|---|---|---|
| 9,411,389 B2 | 8/2016 | Shi et al. | |
| 9,812,870 B2 | 11/2017 | Zhao et al. | |
| 9,964,978 B2 | 5/2018 | Holveck et al. | |
| 10,291,024 B2 | 5/2019 | Majumder et al. | |
| 11,451,065 B1* | 9/2022 | Worku | G05B 19/042 |
| 11,588,333 B2 | 2/2023 | Khatib et al. | |
| 2016/0313716 A1* | 10/2016 | Chen | H02J 4/00 |
| 2019/0207391 A1 | 7/2019 | Fazeli et al. | |
| 2022/0368132 A1 | 11/2022 | Soverns et al. | |

* cited by examiner

*Primary Examiner* — Mohammad Ali
*Assistant Examiner* — Sheela Rao
(74) *Attorney, Agent, or Firm* — Bold IP, PLLC; Christopher Mayle

(57) ABSTRACT

A system and method for establishing a microgrid from an existing electrical grid whereby the system provides a remote terminal that collects data from the electrical grid and the microgrid and communicates the data back to and from the microgrid and the electrical grid, whereby the remote terminal unit may continuously monitor specific parameters from the microgrid and the electrical grid, such as distributed generators, converters, and loads, including power levels, charge levels, voltage levels, current flow, temperature, breaker status, and other information pertinent to the microgrid and the electric grid, while the RTU is designed for microgrid islanding and power flow.

16 Claims, 7 Drawing Sheets

Converter Description

- Controllable Power Factor
- Communication Telemetry
- PLLs for Grid Reconnection/Synchronization

SYSTEM AND METHOD FOR CREATION AND OPERATION OF A MICROGRID FROM A PREEXISTING ELECTRIC GRID

FIELD OF DISCLOSURE

The overall field of this invention is for establishing microgrids from pre-existing electrical grids and more particularly a system designed to control power flow and isolation of the microgrids.

BACKGROUND

A microgrid is a localized grouping of electricity sources and loads that may operate connected to the main power grid and autonomously (in "island mode"). Microgrids offer a means for communities, businesses, or even single households to enjoy a higher degree of energy independence, resilience, and potential sustainability. Microgrids offer numerous advantages, such as improved resilience, potential for integration of renewable energy sources, and localized energy management. However, they also come with a set of challenges and issues that need to be addressed for successful implementation and operation. The many design aspects and obstacles of integrating emerging microgrid technologies into the 21st century grid make it vitally important for a systematic approach in definition and understanding. Some of these aspects include geographical location, (rural or urban), size, topology and make-up, (wind, turbines, solar, hydro, etc., or any combination thereof). Clear problem definitions alongside comprehensive modeling, simulation and analysis are needed in order to meet these challenges in the most widespread and effective manner.

SUMMARY

It is an object of the present invention to establish a microgrid from an existing electrical grid whereby the system provides a remote terminal unit connected as a standalone device or connected to a central control system. The remote terminal unit collects data from the electrical grid and the microgrid and communicates the data back to a central control system and then sends updated commands to the microgrid and the electrical grid. The remote terminal unit may continuously monitor specific parameters from the microgrid and the electrical grid, such as distributed generators, converters, and loads. This data may include power levels, charge levels, voltage levels, current flow, temperature, breaker status, and other information pertinent to the microgrid and the electric grid.

The remote terminal unit may then receive commands from the central control system to execute specific operations, like controlling power flow and isolation of the microgrid with respect to the electrical grid. The remote terminal unit may be designed for counteraction as well as detecting and sending voltage correction commands. The remote terminal unit may act as a unified Power Flow Controller (UPFC) to control the flow of power in the microgrid and the electrical grid to independently control both the active and reactive power flows in the transmission line between them.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps may be carried out in any order or simultaneously (except where the context excludes that possibility), and the method can include one or more other steps which are carried out before any of the defined steps, between two of the defined steps, or after all the defined steps (except where the context excludes that possibility).

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

Figure 1:
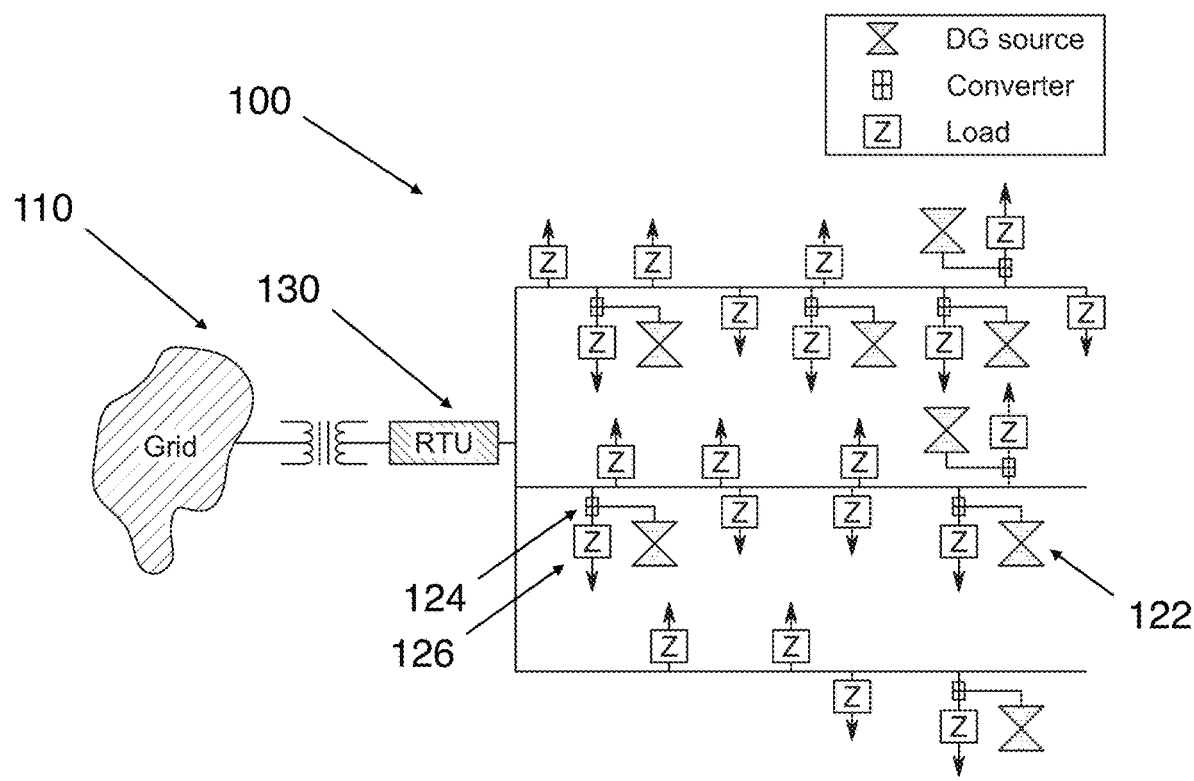
FIG. 1 shows a concept layout.

Turning to FIG. 1, FIG. 1 depicts a block diagram of an embodiment of the present invention for an electric delivery system 100. Electric delivery system 100 may have a plurality of systems including a control system such as an electric grid 110, a microgrid 120, a remote terminal unit 130, which may be integrated in combination within the structure of electric delivery system 100 The various systems may be individually configured and correlated with respect to each other so as to attain the desired objective of providing an electric delivery system 100.

Microgrid 120, may be a cluster of distributed generators, loads, and energy storage systems that can operate as a single controllable entity with respect to grid 110. They can connect or disconnect from grid 110, providing additional flexibility and resilience. In one or more embodiments microgrid 120, may have distributed generators sources 122 that generate electricity near the point of its consumption and may feed power to microgrid 120. Microgrid may have one or more customized smart converters 124, and loads 126. The microgrid must satisfy three criteria: it must contain a source of generation; it must have equipment in place for communication with remote terminal unit 130 for monitoring and control and it must have islanding capability.

Typically, power sustainment by distributed generators within the microgrid has not been achievable. This is due primarily to one or more of the following reasons: no storage devices (or not enough to meet base load demand), no backup generation (or not enough to meet microgrid base load demand), and not enough distributed generator sources to meet microgrid base load demand for smaller output microgrids. Islanding does not occur for low output microgrids, or at least it does not happen automatically. However, power may flow out of the microgrid at the Point-of-Common-Contact, (PCC), at times if microgrid base loading is lower than local generation, (low probability).

In medium output microgrids, power sustainment by local Distributed Generation (DG) is achievable, but only due to the following reasons: 1) storage devices exist to meet some of microgrid base load demand for a limited time; 2) DG sources exist to sustain only their local loads but are disconnected from the microgrid during regional grid power outages. Islanding does occur in medium output microgrids, however there is no backup generation.

In larger output microgrids, power sustainment is achievable and all load demands of the microgrid are met because of the following reasons: 1) enough storage devices exist to meet microgrid base load demand for a considerable time before starting backup generation; 2) enough backup generation exists to meet microgrid base load demand; 3) and enough DG sources exist to sustain their local loads, but also to reduce microgrid base load.

Figure 2:
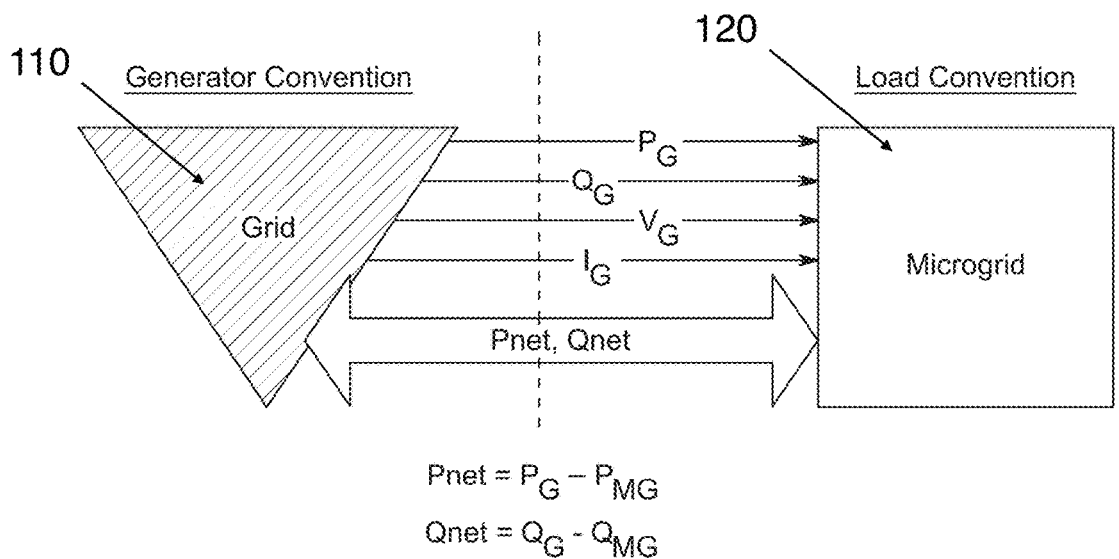
FIG. 2 illustrates the grid interaction.

The microgrid system shown in FIG. 1 illustrates an example microgrid on an existing distribution feed and may be modeled as a single entity as shown in FIG. 2. Moreover, all of the loads within the microgrid will be modeled as one load and all of the distributed generators will be modeled as one distribution source.

Note the generator and load designations in FIG. 2. In this system, grid 110 will always be designated as a generator and microgrid 120 will always be seen as the load. Under this configuration, if (Pnet (or Qnet)>0, wherein Pnet is the Power of the existing grid minus the micro grid and Qnet is the charge of the existing grid minus the micro grid, then microgrid 120 is absorbing real (or reactive) power. On the other hand, if Pnet (or Qnet)<0, then microgrid 120 is producing real (or reactive) power. Of course, if Pnet (or Qnet)=0, then there is no power exchange. Where Q stands for charge, and is a fundamental property of particles that causes them to experience a force when placed in an electric field. Where P represents power, which can be calculated using the formula P=V×I, where V is voltage and I is current. Power is a key concept in understanding how much work can be done by an electrical system or how much energy is consumed.

Microgrid size in terms of power is not an issue since the modeling will be done on a per unit basis. In this way the methodology used in this invention may be scaled to any size microgrid.

Figure 3:
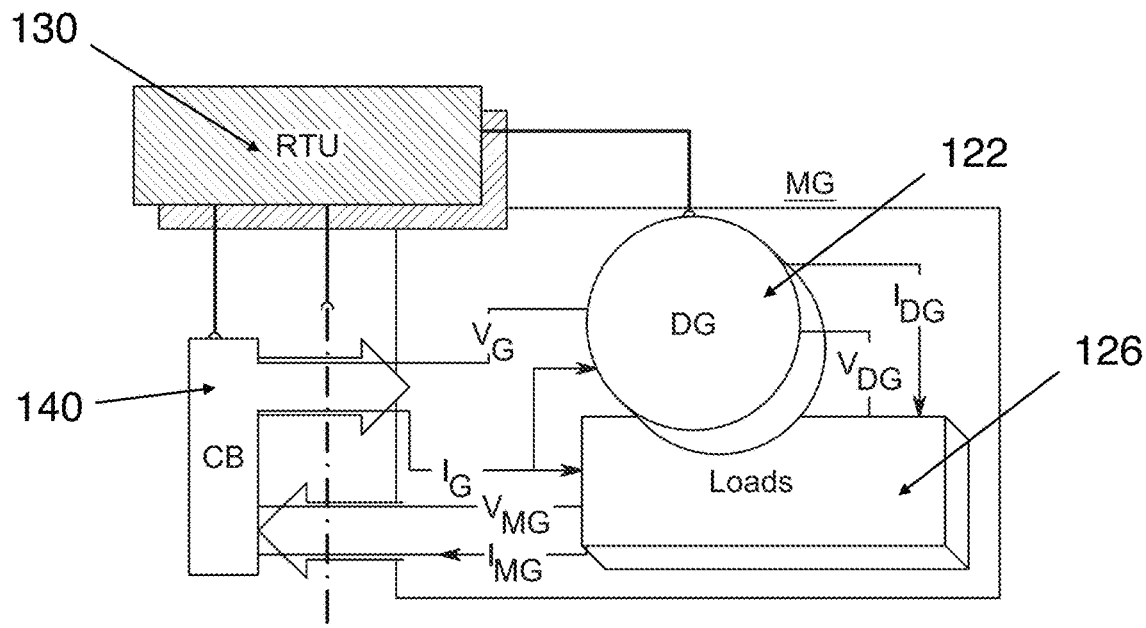
FIG. 3 illustrates the system monitoring and control.

Microgrid 120 may essentially be all of the components that are in place on the feeder side of circuit breaker 140, as illustrated in FIG. 3. Circuit breaker 140 may be near the point of common contact and may be commanded by the remote terminal unit 130 to open for microgrid 120 islanding from the existing grid during regional or local power disturbances or outages.

Remote terminal unit 130 may monitor voltages, currents and power levels on the grid 110 and microgrid 120. More importantly, the microgrid side levels are monitored in order for remote terminal unit 130 to make decisions and commands based upon these values. These commands regulate the microgrid voltage. In further embodiments remote terminal unit 130 role may easily be increased to manage power flow and voltage levels within microgrid 120 as illustrated in FIG. 3

Remote terminal unit 130 may have a control system that may operate to control the actuation of the other systems. Remote terminal unit 130 may have a series of computing devices. Remote terminal unit 130 may be in the form of a circuit board, a memory or other non-transient storage medium in which computer-readable coded instructions are stored, and one or more processors configured to execute the instructions stored in the memory. Remote terminal unit 130 may have a wireless transmitter, a wireless receiver, and a related computer process executing on the processors. Remote terminal unit may include circuitry for monitoring and control via power lines.

The computing devices of remote terminal unit 130 may be any type of computing device that typically operates under the control of one or more operating systems which control scheduling of tasks and access to system resources. The computing devices may be a general purpose computer, phone, tablet, television, desktop computer, laptop computer, gaming system, wearable device electronic glasses, networked router, networked switch, networked, bridge, or any user computing device capable of executing instructions with sufficient processor power and memory capacity to perform operations of remote terminal unit 130.

A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

The computing devices may be integrated directly into remote terminal unit 130, while in other non-limiting embodiments, the remote terminal unit 130 may be a remotely located user computing device or server configured to communicate with one or more other central control systems. Remote terminal unit 130 may also include an internet connection, network connection, and/or other wired or wireless means of communication (e.g., LAN, etc.) to interact with other components. These connections allow users to update, control, send/retrieve information, monitor, or otherwise interact passively or actively with remote terminal unit 130 such as for sending commands for voltage or current correction.

Suitable networks for configuration and/or use, as described herein, include any of a wide variety of network infrastructures. Specifically, a network may incorporate landlines, power lines, wireless communication, optical connections, various modulators, demodulators, small form-factor pluggable transceivers, routers, hubs, switches, and/or other networking equipment.

The network may include communications or networking software and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Remote terminal unit 130 may include control circuitry and one or more microprocessors or controllers acting as a servo control mechanism capable of receiving input from various components. The microprocessors (not shown) may have on-board memory to control the power that is applied to the various components in response to input signals from the various components of electric delivery system 100.

Remote terminal unit 130 may instead refer to any microprocessor-based device that monitors, controls, automates, and/or protects monitored components within a system such as differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, SVC controllers, OLTC controllers, and the like.

In some configurations, remote terminal unit 130 may connect through networks using devices such as multiplexers, routers, hubs, gateways, firewalls, and switches. Networking hardware can either be part of remote terminal unit 130 or communicate separately with them. A remote terminal unit 130 might refer to a standalone unit or a combination of several working in tandem. The described systems and methods may be integrated into or executed by remote control unit 130.

Remote terminal unit 130 may have one or more software modules or components which may be any set of computer instructions or executable code found on a computer-readable storage medium. For example, a software module might consist of multiple computer instructions grouped as a routine, program, object, component, data structure, and so on, serving specific functions or representing specific data types. Such a software module may be made up of various instructions located in different sections of the storage medium, all collaboratively offering the module's described functionality. A module can consist of a single or multiple instructions distributed across several code segments, different programs, and on multiple computer-readable storage devices. Some implementations might be in a distributed computing setup where tasks are executed by a distant processor connected via a network. In these setups, software modules may be stored in either local or remote storage media. Furthermore, data connected in a database may reside in the same or multiple storage devices, and may be interconnected in a database's fields across a network.

Figure 4:
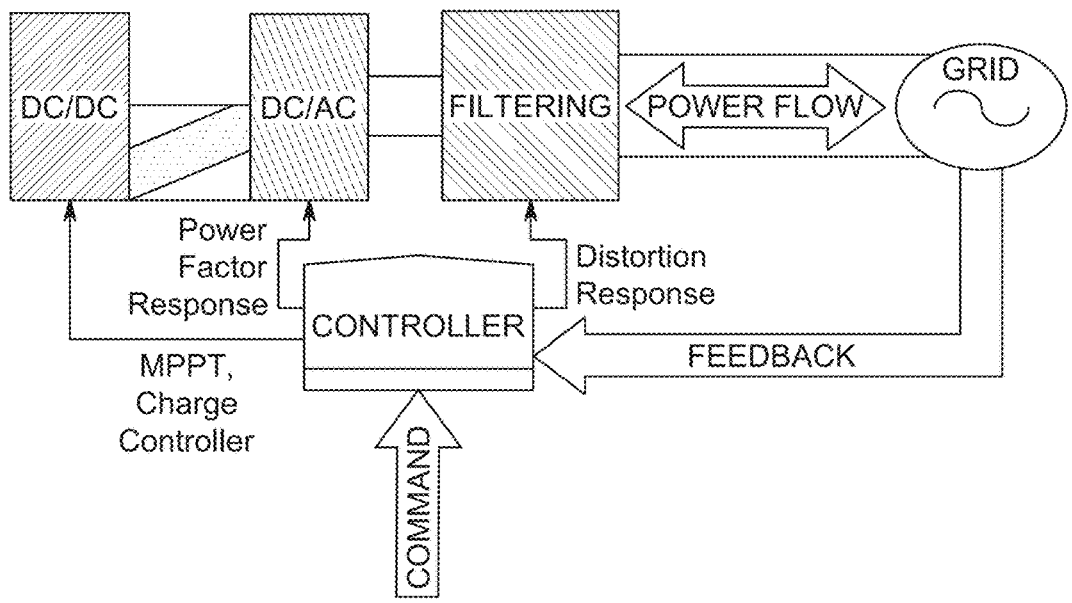
FIG. 4 illustrates the components of the converter.
Figure 5:
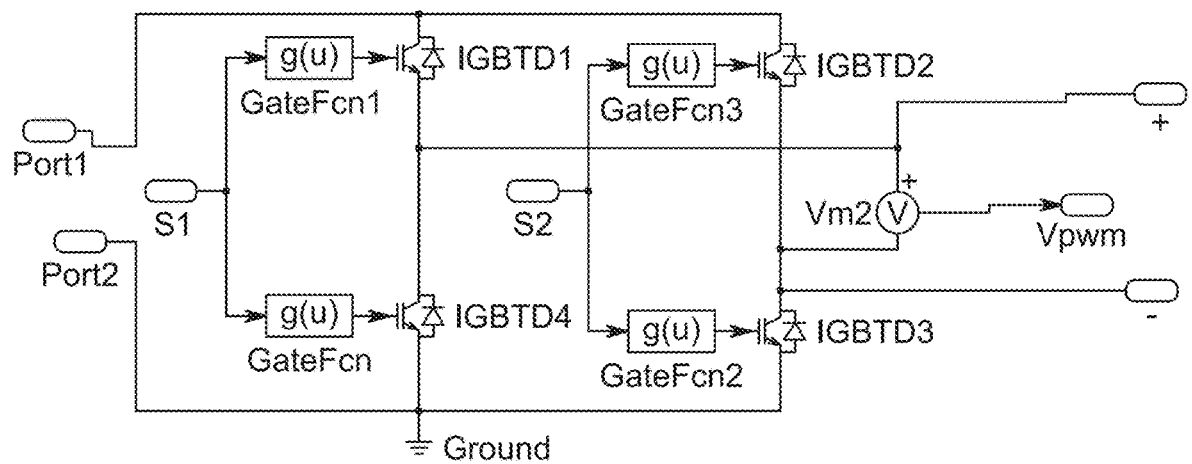
FIG. 5 illustrates H-bridge schematic rendering of the inverter for controlling voltage.

In microgrid 120, distributed generation sources 122 may possess a "smart" converter 124, as illustrated in FIG. 4. Converter 124 may be a device that changes the type or attributes of electrical energy, specifically converting between alternating current (AC) and direct current (DC), or modifying the voltage or frequency of AC power. In these embodiments converter 124 may also communicate data to a remote terminal unit 130 but more importantly may be remotely controlled to adjust its power factor. Converter 124 may have an Inverter H-Bridge that is a single-phase, unipolar pulse-width modulated circuit consisting of four insulated gate bipolar transistors, (IGBTs). The configuration is shown in FIG. 5 and assumes a DC link voltage of 400 volts. This voltage was chosen based upon the highest AC voltage, (264 Vrms=1.1 p.u.), although this value will vary in actuality depending on external conditions such as solar radiation, battery status and DC conversion approach.

The other key feature of this inverter and what makes it intelligent is the ability to manipulate the power factor. Depending on the mode, (generator or load convention), it is then possible to command reactive power delivery or absorption by manipulating the power factor. Power factor response will be ultimately controlled by altering the switching sequence. This is accomplished by first determining reference current and then using this as an input to the PWM. The following calculations illustrate how a reference current is generated from a reactive power command.

Ig is generated from the reactive power command as follows:

S=P+jQ; S=Apparent Power, P=Real Power, Q=Reactive Power

From this relation, at unity power factor, Q=0 Volt-Amps. When an injection is commanded, Q is non-zero and the current magnitude and angle is calculated from the following relation:

$$(Vrms)(Irms)\angle\Theta = P+jQ \Rightarrow Irms/Q=(P/Vrms)+j(Q/Vrms)_{=Ig}$$

Figure 6:
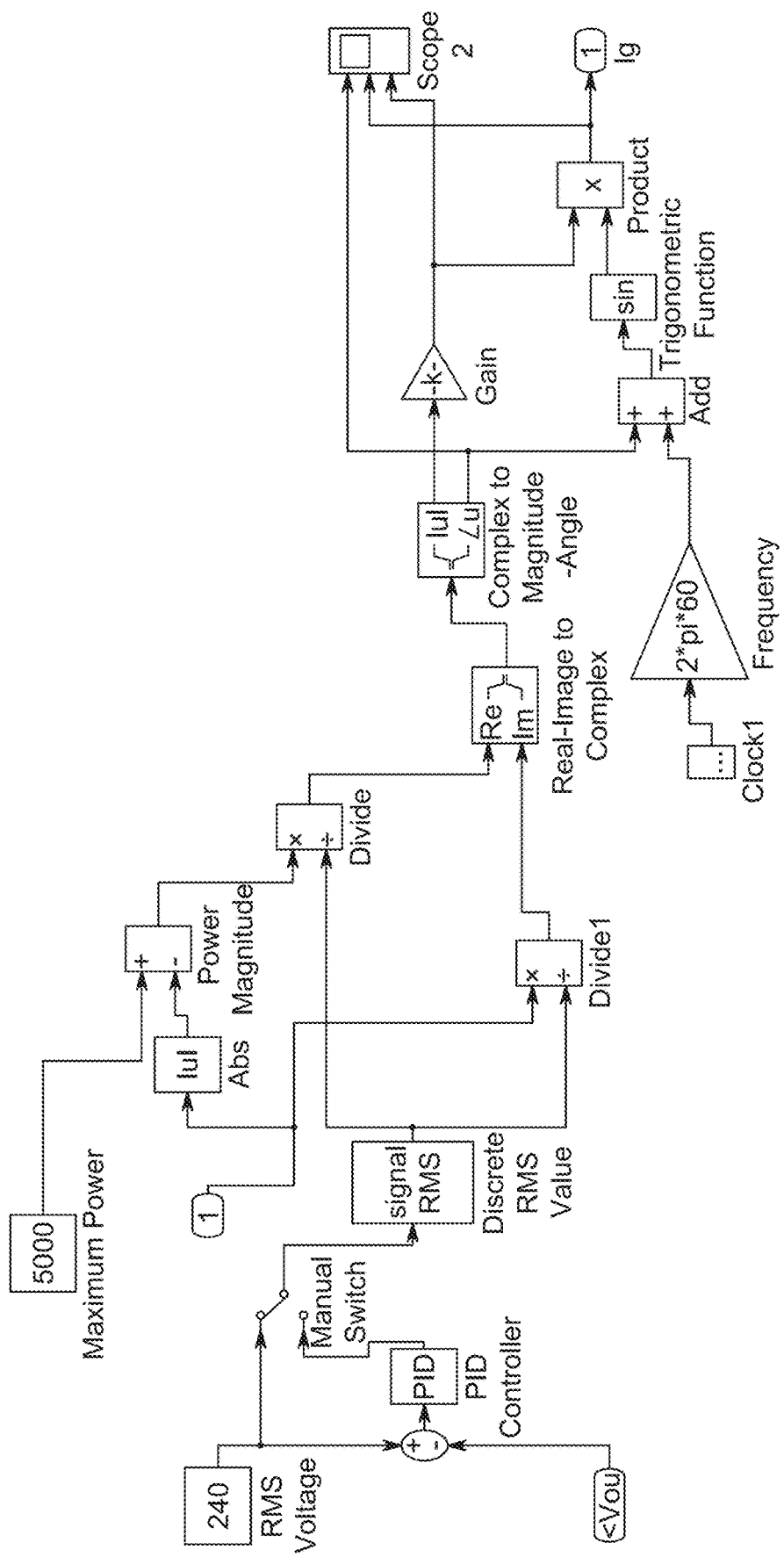
FIG. 6 illustrates a circuit diagram for the power factor control.

A control circuit is created to generate a current having a magnitude and phase that will produce the commanded reactive power. FIG. 6 shows the circuit for producing a reference current, Ig. Since the maximum power output of the inverter is 5000 watts, this limit must be taken into account when generating a current setting. Theoretically, 5000 (1 p.u.) volt-amps-reactive (VAR), may be injected. If this is the case, then zero real power is produced and θ=90°. Therefore, the injected power is subtracted from the total power. Although a better way to calculate this trade-off exists, (setting S=to the maximum setting and solving for P), this simple approach provides a viable parameter, and is accurate at the limits, (Q=5000 VAR or P=5000 watts). The RMS voltage may be fixed at a given amount, (in this case, 240 volts), or may be fed-back from the grid. If the grid voltage is used for an input parameter for determining Ig, then a PID Controller must be used to provide a steady-state response. Also note the output of the "Complex to Magnitude-Angle" block is multiplied by a gain of √2 since the actual input is an RMS value. A sine wave is generated from the angle output of the "Complex to Magnitude-Angle" block and then is multiplied by the peak value from the gain output.

Another key functionality converters 124 have are phase-locked loops (PLLs), which synchronize the distributed generator sources 122 with the microgrid AC voltage waveforms. When the microgrid has been islanded by opening the circuit breaker which isolates it from the grid, then all of converters 124 connected to the DGs 122 are already synchronized and no control action is needed. However, upon reconnection, these sources must be again be synchronized to grid 110

During operation the phase locked loops may compare the phase of two input signals and produces an error signal that is proportional to the phase difference between them. A voltage-controlled oscillator then may produce an oscillating signal whose frequency is determined by its input voltage. A low pass filter then may filter the output of the phase detector to remove high-frequency components and provides a smooth control voltage. A frequency divider may be included in the feedback loop to allow for output frequencies that are integer multiples of the reference frequency. When the distributed generator sources 122 begins to drift with the microgrid AC voltage waveforms, the phase detector senses this shift and produces an error voltage. This error voltage is filtered by the low pass filter and then sent to the voltage-controlled oscillator, adjusting its frequency to bring the distributed generator sources 122 back in phase alignment after reconnection.

The keys in stabilizing the voltage will be for the microgrid to have both storage and converters 124. Converter 124 may be seen as a shunt current source on microgrid 120, rather than a voltage source. As such, a series voltage correction is not achievable primarily because of connection configuration, but a shunt current injection is. Presently there are systems for responding to voltage disturbances which inject series voltage or shunt reactive current which are complex and costly, and only used during voltage events; being in standby a large part of the time.

In order to counteract voltage sag/surge, there must be enough distributed energy storage. Moreover, converters 124 connected to the energy storage must have telemetry and be controllable with regard to reactive power.

The storage elements are needed in order to dump complex power. This is assuming the storage elements are not to capacity. If all storage elements are at capacity, then some type of load dump is needed. A load dump may be in the form of a standby battery bank or a flywheel that can take-on the extra energy. A less efficient proposition may also be used to divert the power to resistive heating elements which dissipate the heat energy to the environment or some other process. Either way, the storage or dissipation device must be able to react quickly to any voltage deviations on a microgrid 120.

As discussed with storage or dissipation elements in place, remote terminal unit 130 may manage power flow within microgrid 120 by monitoring voltages and currents at various locations within the microgrid. In one or more embodiments, these locations will be at distributed generator sources 122 and communicated via converters 124. Power flow calculations may then be made based upon these values, and commands can then be relayed to converters 124 from remote terminal unit 130 for power factor control. The other vital function remote terminal unit 130 will perform is monitoring storage capacity on microgrid 120 in order to properly react to voltage deviations.

Figure 7:
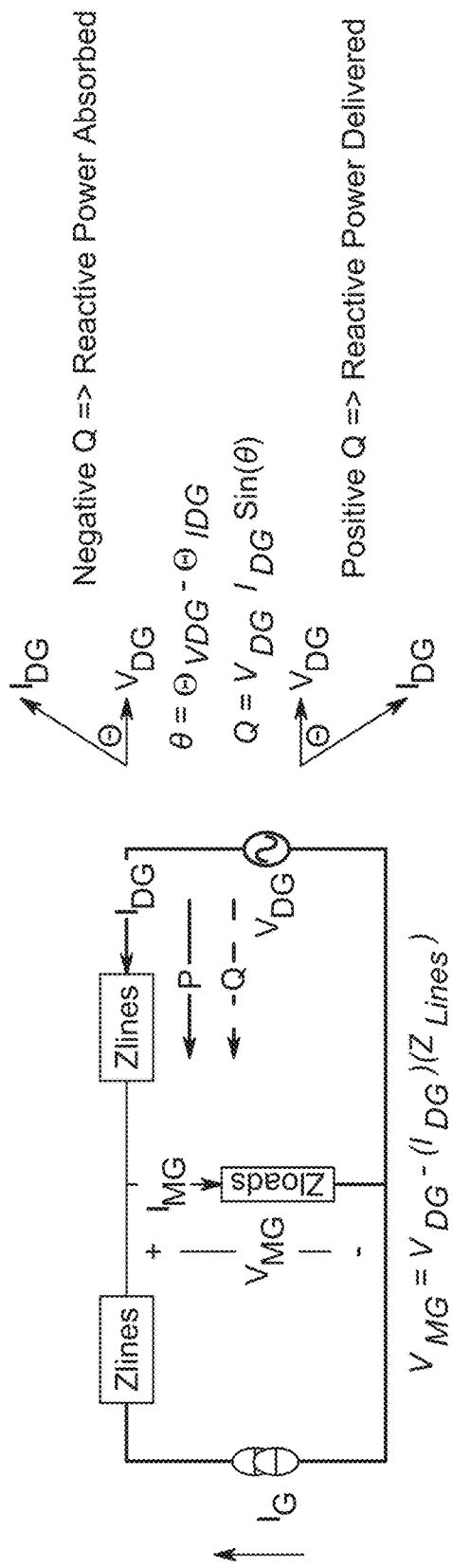
FIG. 7 illustrates a circuit diagram for the generator configuration.

To simplify and for the purposes of this invention, all of the loads will be modeled as one load and the distributed generators as one source. FIG. 7 illustrates the microgrid operation in generator configuration. Note that $I_{MG}=I_G+I_{DG}$. If $I_G$ is negative, then all of the load power demands are being met by the distributed sources alone, and apparent power is being delivered to the grid, (Pnet and Qnet are negative). Most of the time, $I_G$ will exist at a lower level than it would be without DG input since the DGs are only supplementing power to the loads. If power factor (pf) correction is not being command by remote terminal unit 130, then the DG is operating at unity power factor, (i.e.— only real power is being delivered). On the other hand, if there is reactive power control (or pf correction), then reactive power is being delivered or absorbed, as indicated in FIG. 7. Not shown in this figure is the fact that $V_{MG} \approx V_G$.

During operation remote terminal unit 130 will monitor both $V_{MG}$ and $V_G$. When a large enough voltage deviation occurs, then a response will be generated to counteract the sag or surge. In order to have a positive effect, the generator configuration illustrated by FIG. 7 must be changed to the load configuration shown in FIG. 8. $I_{DG}$ now flows in the opposite direction from what it was in the generator configuration. Also note the sign change in the equation $V_{MG}=V_{DG}+I_{DG} Z_{lines}$.

At this point, current is flowing in the opposite direction and the voltage at $V_{MG}$ may be restored. $V_{DG}$ will not change since it is set by the grid voltage, $V_G$. The line and load impedances are, for all intents and purposes, a static quantity. However, the DG power factor may be manipulated such that these impedances may be either more/less inductive or capacitive. Another important quality to observe is the power flow directions. Even though the DG(s) is in a load configuration, both P and Q may remain flowing from right-to-left, and thus are still being delivered. Therefore, given the ability to manipulate power factor and apparent power, $V_{MG}$ can now be restored to its specified value.

Figure 8:
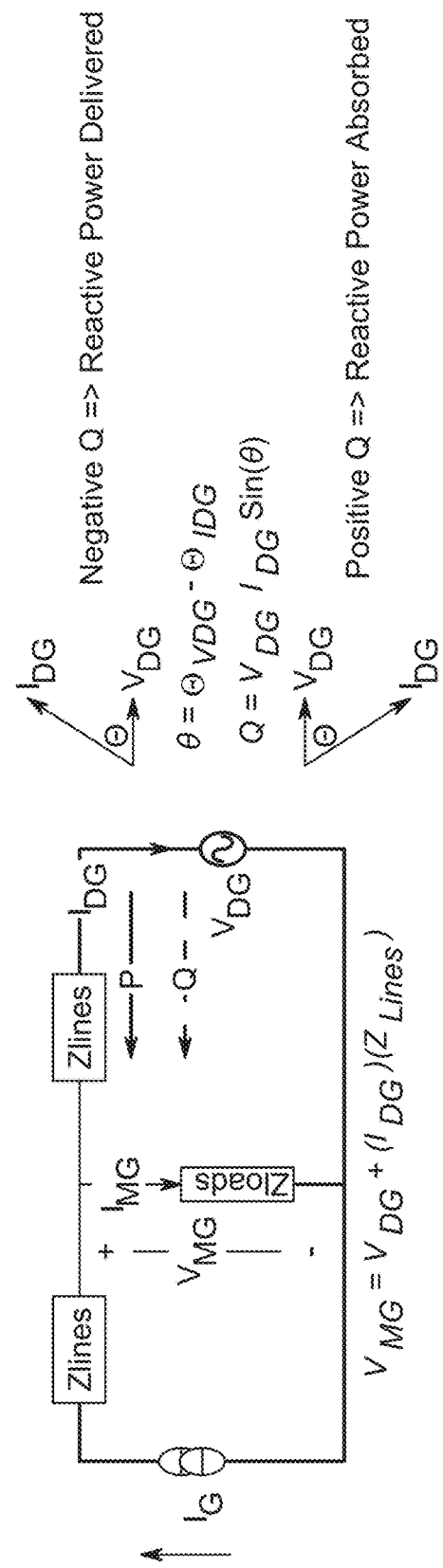
FIG. 8 illustrates equivalent modeling for the converted microgrid load and generator configuration, including reactive power flow (controlled).
Figure 9:
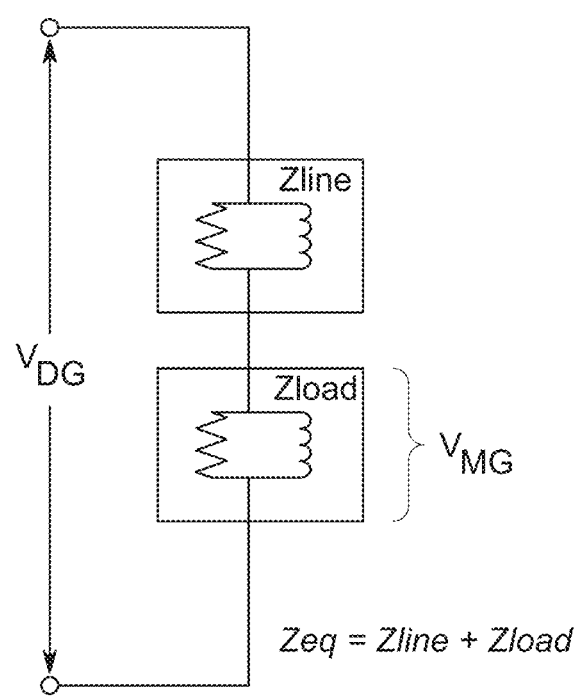
FIG. 9 illustrates a circuit diagram for the microgrid equivalent impedance.
Figure 10:
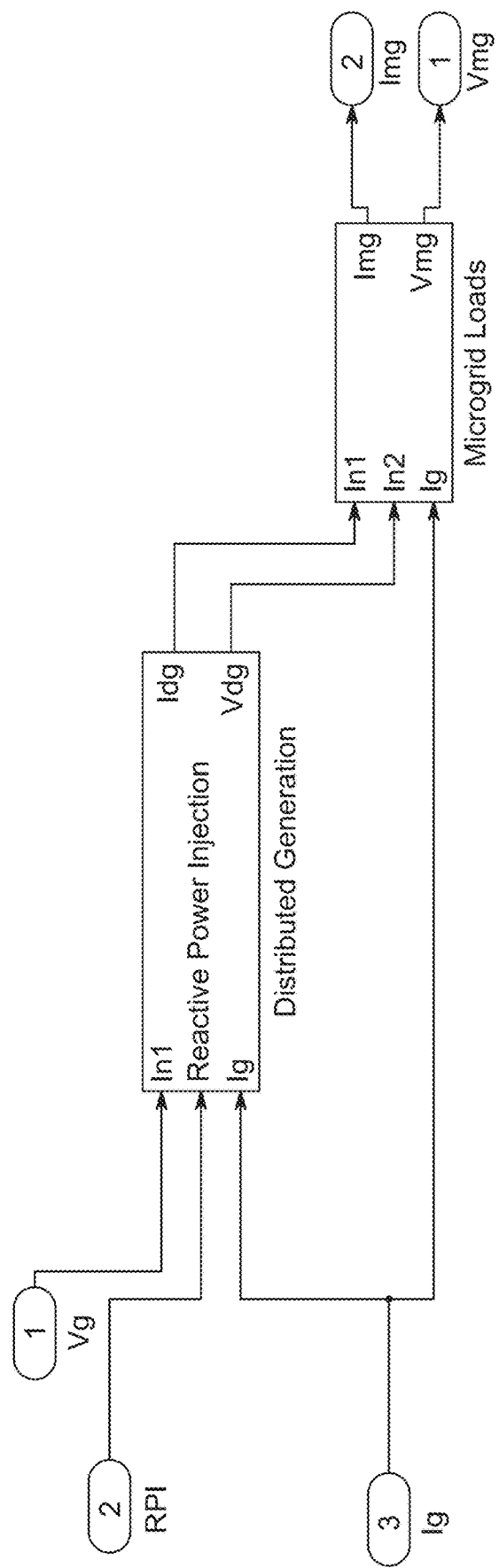
FIG. 10 illustrates a high level microgrid block diagram.

In order to compensate for the reactive power absorption for the inductive loads, (or delivered in the case of capacitive loads), an equivalent impedance is calculated. Looking into the circuit, (as shown in FIG. 7 and FIG. 8), from the DG side, the $I_G$ ideal current source is opened, and the circuit now may be configured as shown in FIG. 9.

Equivalent impedance is now calculated as follows:

$$Zeq = \left[\frac{R_{line}X_{line}}{R_{line}+X_{line}}\right] + \left[\frac{R_{load}X_{load}}{R_{load}+X_{load}}\right]$$

$$Zeq = \left[\frac{(R_{line}X_{line})(R_{load}+X_{load}) + (R_{load}X_{load})(R_{line}+X_{line})}{(R_{line}+X_{line})+(R_{load}+X_{load})}\right]$$

$R_{line} \approx 0$ $$Zeq = \left[\frac{(R_{load})(X_{load}X_{line})}{(X_{line}X_{load})+(R_{load}X_{line})}\right] = \left[\frac{R_{load}X_{load}}{X_{load}+R_{load}}\right]$$

$R_{line} \approx 0$.

Notice the line impedance has dropped-out of the equivalent impedance. Zeq may be further simplified to an equivalent resistance and impedance as follows:

$$(X_1 = jX_{load}) => Zeq = \left[\frac{(R_{load})(jX_l)}{R_{load}+jX_l}\right] = \frac{(R_{load})(jX_l) \times (R_{load}-jX_l)}{(R_{load}+jX_l) \times (R_{load}-jX_l)}$$

$$Zeq = \frac{(R_{load}X_l^2)+(jR_{load}^2 X_l)}{R_{load}^2+X_l^2)}$$

In order to compensate for the reactive power absorption for the inductive loads, (or delivered in the case of capacitive loads), an equivalent impedance is calculated. Looking back into the circuit, (as shown in FIG. 7 and FIG. 8), from the DG side, the $I_G$ ideal current source is opened and the circuit now may be configured as shown in FIG. 9.

Therefore, the equivalent reactance is as follows:

$Xeq=(R^2_{load}X_1)/(R^2_{load}+X^2_1)$. This reactance can now be compensated by deriving a reactive power relation and subsequently commanding the DG(s) to adjust their power factor(s) accordingly.

For voltage restoration to occur, the RTU must determine if there is enough energy storage/dump capacity available to command the DG(s) to go into load configuration, and if so, how much reactive power (Q), should be introduced. Reactive power may be found by the following relation:

$$Q = \frac{V^2}{X}(\cos(\delta)-1)$$

Where V is the voltage magnitude, in this case it is equal to the microgrid bus voltage ($V_{MG}$ or $V_G$). The angle $\delta$ is the voltage phase angle difference between $V_{DG}$ and $V_{MG}$. During normal operation, reactive power generated from the DG may be commanded to compensate for the load impedances.

$$Q_{loadcomp}=(V_G^2/Xeq)(\cos(\theta_{VG}-\theta_{VDG})-1)$$

Therefore the voltage phase angles must be known in order to formulate the reactive power command.

If a voltage deviation occurs, the following sequence of events takes place. First, the amount of deviation, $\Delta V$, must be related to a reactive power quantity, Q. This is done as follows:

$$\Delta V = V_G - V_{MG}$$

$$\Delta V = V_G - [V_{DG} - I_{DG}Z_{lines}] = (V_G - V_{DG}) + I_{DG}Z_{lines}$$

$$V_G - V_{DG} = 0, \; Zlines \approx Xlines$$

$$X_{lines} = \Delta V / I_{DG}$$

The current, $I_{DG}$, is constantly monitored by remote terminal unit 130 and is relatively constant under both normal and voltage correction modes of operation. Any extra current needed during a voltage sag event would be supplied by the main grid. Now the delta in reactive power may be computed:

$$\Delta Q = (V_G^2 / X_{lines})(\cos(\theta_{VG} - \theta_{VDG}) - 1)$$

This quantity is added to the reactive power compensation command, ($Q_{loadcomp}$), to form the total commanded reactive power.

$$Q_{commanded} = Q_{loadcomp} + \Delta Q$$

Power flow on the microgrid is governed by remote terminal unit 130. In a voltage sag condition, real power must be absorbed, and thus dumped. Therefore, remote terminal unit 130 will determine the storage (dump) reserve of microgrid 120. Finally, a reactive power command is transmitted to the DGs 122. FIG. 6 demonstrates how a reactive power command is realized in the converter itself.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for opening a microgrid for islanding from an existing grid, comprising: a remote terminal unit, wherein the remote terminal unit opens for the islanding from the existing grid, wherein the remote terminal unit is a unified power flow controller to control flow of power in the microgrid and the existing grid to independently control both active and reactive power flows in a transmission line between them, wherein the remote terminal unit is configured to: monitor voltage, current, and power level on the existing grid and the microgrid; control isolation of the microgrid from the existing grid during power disturbances or outages; manage power flow within the microgrid by monitoring voltages and currents at distributed generator sources within the microgrid; and determine storage capacity of the microgrid; generate a response when a predetermined voltage deviation occurs to counteract voltage sag or surge.

2. The system of claim 1, wherein when the power of the existing grid minus the power of the microgrid (Pnet) or charge of the existing grid minus charge of the microgrid (Qnet) is greater than 0, the microgrid is absorbing real or reactive power, wherein when the Pnet or the Qnet is less than 0, then the microgrid is producing the real or the reactive power, wherein when the Pnet or the Qnet=0, then there is no power exchange.

3. The system of claim 1, further comprising converters with phase-locked loops that synchronize the distributed generator sources with AC voltage waveforms of the microgrid.

4. The system of claim 3, wherein when the microgrid is islanded by opening a circuit breaker, the converters connected to the distributed generator sources remain synchronized without additional control action.

5. The system of claim 4, wherein during operation, the phase-locked loops: compare phases of two input signals; produce an error signal proportional to a phase difference between them; use a voltage-controlled oscillator to produce an oscillating signal with frequency determined by the error signal; filter the oscillating signal with a low pass filter to provide a smooth control voltage.

6. The system of claim 5, wherein the phase-locked loops further comprise a frequency divider.

7. The system of claim 6, wherein the frequency divider is configured to: receive the oscillating signal from the voltage-controlled oscillator; and produce output frequencies that are integer multiples of a reference frequency.

8. The system of claim 7, wherein the frequency divider is further configured to: receive enable synchronization of the distributed generator sources with microgrid AC voltage waveforms at various frequency ratios; adjust its division factor in response to changes in microgrid frequency, thereby maintaining phase alignment between the distributed generator sources and the microgrid during both islanded operation and grid-connected modes.

9. The system of claim 1, wherein the remote terminal unit is further configured to: calculate an equivalent impedance to compensate for reactive power absorption for inductive loads in the microgrid, wherein the equivalent impedance is calculated as: Zeq=(Rload*X1)/(Rload+jX1) where Rload is load resistance and X1 is load reactance.

10. The system of claim 9, wherein the remote terminal unit is further configured to: calculate an equivalent resistance as: Req=(R^2load*Rload)/(R^2load+X^21).

11. The system of claim 10, wherein the remote terminal unit is further configured to: derive a reactive power relation based on the calculated equivalent reactance; command distributed generator sources to adjust their power factors based on the derived reactive power relation.

12. The system of claim 1, wherein the remote terminal unit is further configured to: determine if there is sufficient energy storage or dump capacity available to command the distributed generator sources to enter a load configuration; determine an amount of reactive power to be introduced based on available capacity.

13. The system of claim 12, wherein the remote terminal unit determines the reactive power to be introduced using an equation: Q=(V^2/X)*sin ($\theta$) where V is voltage magnitude, X is reactance, and $\theta$ is voltage phase angle difference.

14. The system of claim 13, wherein during normal operation, the reactive power generated from the distributed generator sources is commanded to compensate for load impedances using the equation: $Q\_loadcomp=(V\_G^2/Xeq)*(\cos(\theta\_VG-\theta\_VDG)-1)$ where $V\_G$ is the grid voltage, $Xeq$ is equivalent reactance, $\theta\_VG$ is the voltage phase angle of the grid, and $\theta\_VDG$ is the voltage phase angle of the distributed generator.

15. The system of claim 14, wherein during a voltage sag event, delta in the reactive power is calculated by the equation: $\Delta Q=(V\_G^2/X\_lines)*(\cos(\theta\_VG-\theta\_VDG)-1)$ where $V\_G$ is the grid voltage, $X\_lines$ is the reactance of lines, $\theta\_VG$ is the voltage phase angle of the grid, and $\theta\_VDG$ is the voltage phase angle of the distributed generator.

16. The system of claim 15, wherein the $\Delta Q$ is added to the $Q\_loadcomp$ to form a total commanded reactive power, wherein: $Q\_commanded=Q\_loadcomp+\Delta Q$.

* * * * *